United States Patent
Saieg et al.

(10) Patent No.: US 7,360,774 B2
(45) Date of Patent: Apr. 22, 2008

(54) CAST TRAILING ARM ASSEMBLY FOR TRAILER SUSPENSION

(75) Inventors: Steven George Saieg, Rochester Hills, MI (US); Craig Allen Holt, Chesterfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 238 days.

(21) Appl. No.: 11/016,297

(22) Filed: Dec. 17, 2004

(65) Prior Publication Data

US 2006/0033304 A1 Feb. 16, 2006

Related U.S. Application Data

(63) Continuation-in-part of application No. 10/916,127, filed on Aug. 11, 2004.

(51) Int. Cl.
  *B60G 7/00* (2006.01)
(52) U.S. Cl. .................. 280/124.128; 280/124.13; 280/124.116
(58) Field of Classification Search ......... 280/124.116, 280/124.128, 124.129, 124.13, 124.144, 280/124.153
See application file for complete search history.

(56) References Cited

U.S. PATENT DOCUMENTS 5,690,353 A * 11/1997 Vandenberg ......... 280/124.116
6,241,266 B1 * 6/2001 Smith et al. .......... 280/124.116
6,557,875 B2 * 5/2003 Schlosser et al. ..... 280/124.153
7,048,288 B2 * 5/2006 Chan et al. ........... 280/124.116
7,086,655 B2 * 8/2006 Chan et al. ........... 280/124.116
2003/0146592 A1 * 8/2003 Chalin et al. ......... 280/124.116
2004/0080132 A1 4/2004 Chan et al.
2004/0183271 A1 * 9/2004 Galazin et al. ....... 280/124.128

FOREIGN PATENT DOCUMENTS

GB 2367272 A * 4/2002
GB 2367273 A * 4/2002
GB 2396140 A * 6/2004
WO WO 2004/054825 A2 7/2004

OTHER PUBLICATIONS

European Search Report, Mar. 24, 2006.

* cited by examiner

*Primary Examiner*—Ruth Ilan
(74) *Attorney, Agent, or Firm*—Carlson, Gaskey & Olds

(57) ABSTRACT

A trailing arm assembly for a suspension includes at least first and second cast components. The first and second cast components are welded to each other to substantially surround an outer perimeter of an axle member. The first cast component is then welded to one side of the axle member at a first weld and the second cast component is welded to an opposite side of the axle member at a second weld. A bushing tube is then welded to one of the first and second cast components and is subsequently attached to a vehicle frame member. The first weld area comprises a pair of laterally spaced window welds and the second weld area comprises a single window weld.

16 Claims, 5 Drawing Sheets

US 7,360,774 B2

CAST TRAILING ARM ASSEMBLY FOR TRAILER SUSPENSION

RELATED APPLICATION

This application is a continuation-in-part of U.S. application Ser. No. 10/916,127 filed Aug. 11, 2004.

TECHNICAL FIELD

The subject invention relates to a trailing arm assembly for a suspension that includes at least two cast components that are welded to an axle member and a bushing tube that is welded to one of the cast components.

BACKGROUND OF THE INVENTION

A suspension system includes a pair of trailing arm assemblies that are attached to an axle beam member. One trailing arm assembly is positioned near one end of the axle beam member and another trailing arm assembly is positioned near an opposite end of the axle beam member. The trailing arm assemblies are pivotally connected to a vehicle frame member at a first end and support air springs at a second end. The trailing arm assemblies are attached to the axle beam member at a position between the first and second ends. The trailing arm assemblies need to be lightweight and must be capable of operating under high load conditions.

Traditionally, each trailing arm assembly is manufactured from a plurality of stamped pieces of sheet metal that are welded together, and which are welded to the axle beam member. Depending on the type of trailing arm assembly, as many as ten (10) or more pieces are required to form each trailing arm assembly. Performing the welding operations to attach these pieces together is an expensive and time-consuming process. Further, each weld joint area provides a potential failure initiation point. Improperly welded joints can result in premature cracking and joint failure due to shock loads or overloading.

Thus, it is desirable to provide a trailing arm assembly for a suspension that is lightweight and high strength and that reduces the number of welded joint areas. The trailing arm assembly should also have fewer components and be less time consuming to assemble, as well as overcoming the other above-mentioned deficiencies in the prior art.

SUMMARY OF THE INVENTION

A trailing arm assembly for a suspension includes at least first and second cast components. The first and second cast components are welded to each other to substantially surround an outer perimeter of an axle member. The first cast component is welded to one side of the axle member at a first weld and the second cast component is welded to an opposite side of the axle member at a second weld.

In one example, the first cast component is a rear suspension arm that includes an integrally formed air spring seat and the second cast component is a front suspension arm that includes an integrally formed bushing receiver portion. A bushing tube is mounted to the bushing receiver portion, and the bushing tube is then connected to a bracket supported by a vehicle frame. The bushing tube defines a central bushing axis and includes an outer peripheral surface that extends 360° about the central bushing axis. The bushing receiver portion includes an arcuate surface that extends less than 360° about the central bushing axis. The outer peripheral surface of the bushing tube is abutted against the arcuate surface of the bushing receiver portion, and then the bushing tube and front suspension arm are welded together.

The axle member defines a lateral axis that extends between a pair of vehicle wheels. In one example configuration, the front suspension arm includes first and second window weld areas, and the rear suspension arm includes a third window weld area. The first and second window weld areas are positioned on laterally opposed sides of an arm portion that extends transverse to the lateral axis. The third window weld area is positioned laterally between the first and second window weld areas.

In one example embodiment, the front suspension arm includes a shock absorber side mount portion. The shock absorber side mount portion includes a frustro-conical recess that extends into a side wall of the second cast component. A fastener extends into the frustro-conical recess and fastens the front suspension arm to a shock absorber.

The subject invention provides a lightweight and high strength trailing arm assembly having fewer components, and which is less expensive and time consuming to assemble compared to prior designs. These and other features of the present invention can be best understood from the following specification and drawings, the following of which is a brief description.

DETAILED DESCRIPTION OF THE PREFERRED EMBODIMENT

Figure 1:
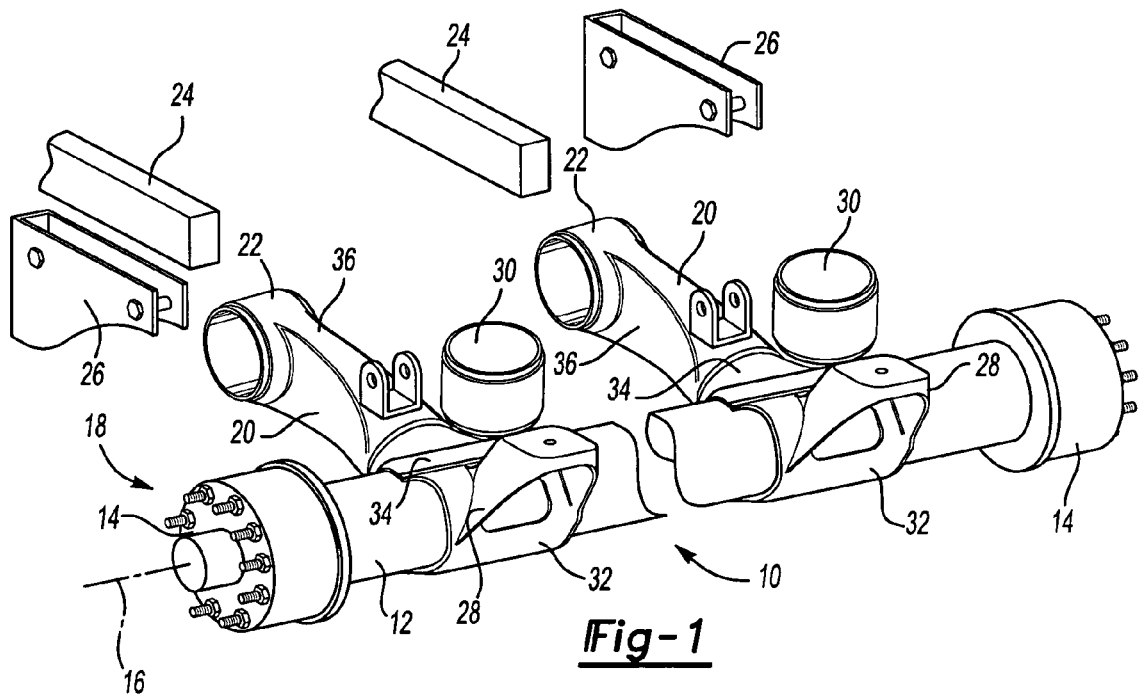
FIG. 1 is a perspective view of an axle and pair of trailing arm assemblies incorporating the subject invention.

An axle assembly 10 is shown in FIG. 1. The axle assembly includes an axle beam 12 extending laterally between a pair of wheel ends 14. The axle beam 12 defines a lateral axis of rotation 16. The wheel ends 14 support tires (not shown) that rotate about the lateral axis of rotation 16.

The subject invention provides a suspension assembly, shown generally at 18, that includes a pair of unique trailing arms 20 that are laterally spaced apart from each other. Each trailing arm 20 includes a first end 22 that is pivotally connected to a vehicle frame member 24 with a connector assembly 26, and a second end 28 that supports a suspension component 30.

In one example, the axle beam 12 is a tube for a trailer axle assembly, however, it should be understood that the suspension assembly 18 with the unique trailing arms 20 could also benefit suspensions for other axles such as drive or non-drive steer axles, single drive axles, tandem drive axles, tag axles, etc. When used with a trailer axle assembly, the vehicle frame member 24 is a trailer frame member, the connector assembly 26 is typically a frame bracket assembly, and the suspension component 30 is typically an air spring. It should be understood that the connector assembly 26 and suspension component 30 are just examples, and that other connector configurations and suspension components known in the art could be used in place of the drop link assembly and air spring. Further, the suspension assembly 18 includes additional components to complete the suspension assembly 18 that are not shown, but are well known in the art.

Each trailing arm 20 includes a first cast component 32, a second cast component 34, and a third cast component 36. The first 32 and second 34 cast components are welded to each other and then are separately welded to the axle beam 12. The first 32 and second 34 cast components substantially surround the axle beam 12 after welding. The third cast component 36 is then welded to the second cast component 34.

Figure 2:
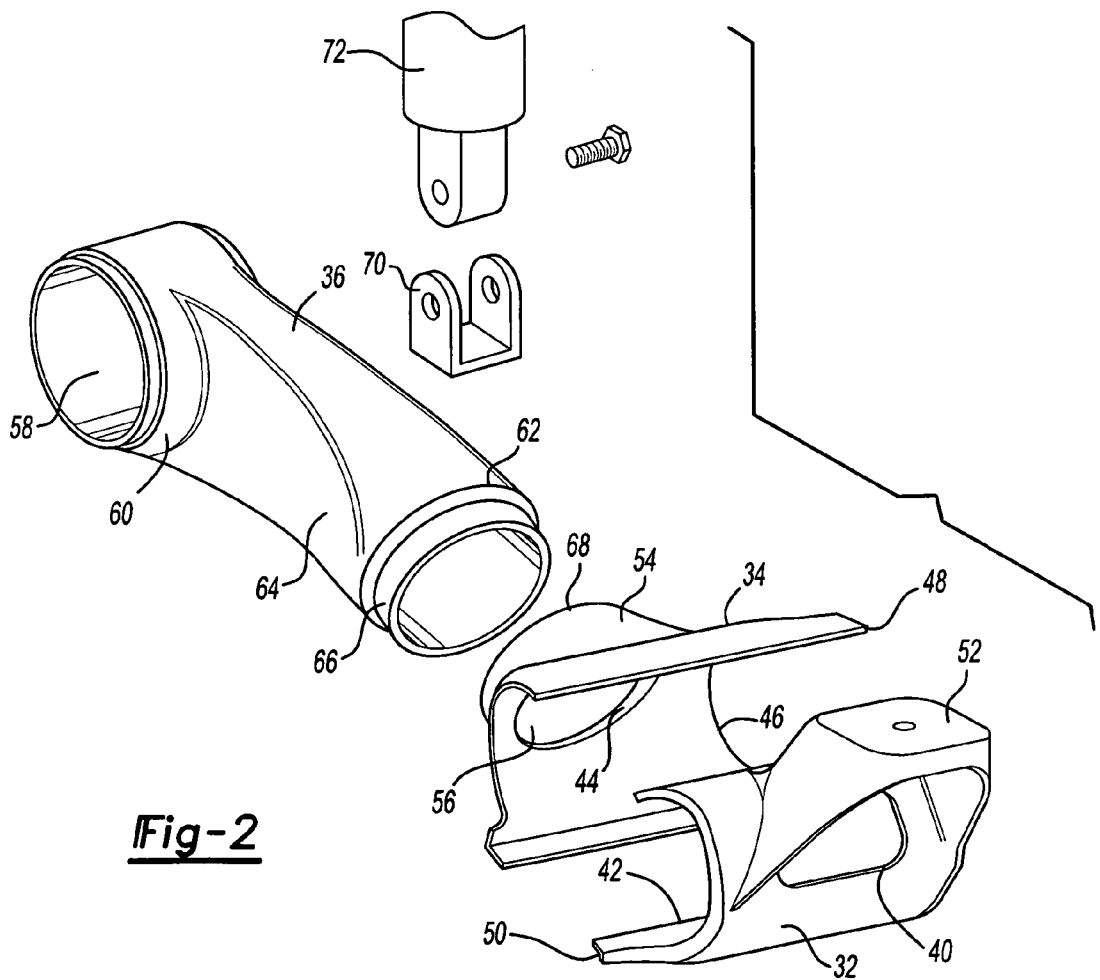
FIG. 2 is an exploded view of one trailing arm assembly from FIG. 1.
Figure 3:
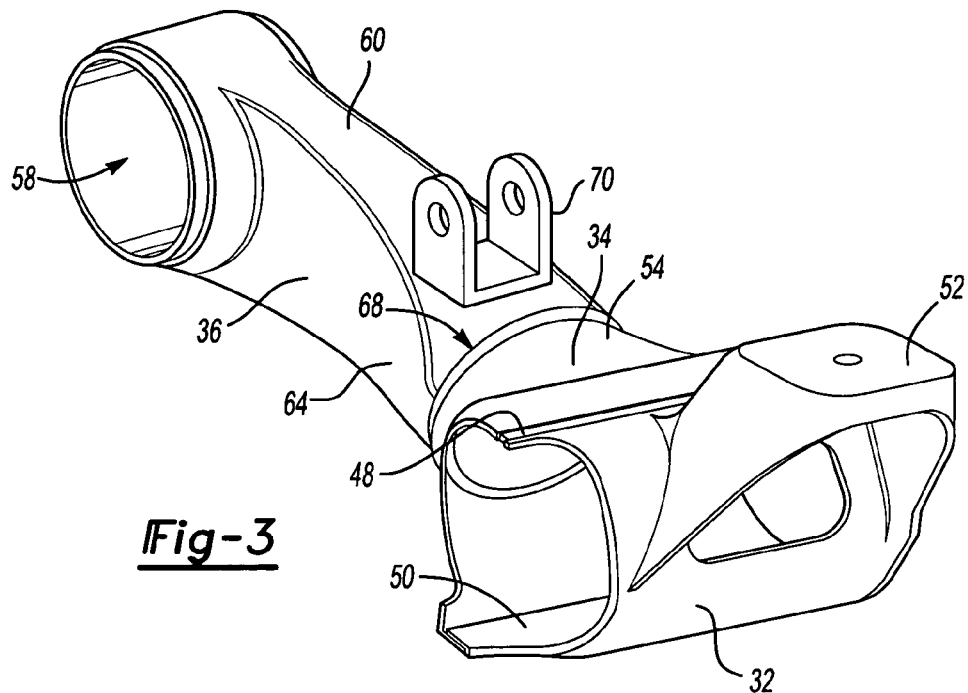
FIG. 3 is a perspective view of the trailing arm assembly of FIG. 2.

The first 32, second 34, and third 36 cast components are shown in greater detail in FIGS. 2 and 3. The first 32 and second 34 cast components include weld areas for attachment to the axle beam 12. Any type of welded joint or welding process known in the art can be used to attach the weld areas to the axle beam 12. In one example, the first cast component 32 includes a first window weld area 40 and defines an inner surface 42 that substantially surrounds one side of the axle beam 12. The second cast component 34 includes a second window weld area 44 and defines an inner surface 46 that substantially surrounds an opposite side of the axle beam 12. The first 32 and second 34 cast components are welded to each other at 48, 50. The first cast component 32 is then welded to the axle beam 12 via the first window weld area 40 and the second cast component 34 is welded to the axle beam 12 via the second window weld area 44. Throughout this application, it should be understood that the window welds preferably extend all around the periphery of the openings. However, other weld joints would come within the definition of a window weld.

The first cast component 32 includes an integrally formed air spring seat 52 that supports the suspension component 30. The second cast component 34 includes an integrally formed tubular portion 54 that defines an opening 56. The third cast component 36 includes a bushing housing 58 that is integrally formed at one end 60 and a tubular portion 62 that is integrally formed at an opposite end 64. The tubular portion 62 includes a reduced diameter area 66 that has a smaller diameter than opening 56.

The second window weld area 44 is accessible through the opening 56. Once the second cast component 34 is welded to the axle beam 12, the third cast component 36 is welded to the second cast component 34. More specifically, the reduced diameter area 66 is inserted into the opening 56, and the tubular portions 54, 62 are welded together at 68.

A shock absorber bracket 70 is then welded to the third cast component 36. The shock absorber bracket 70 mounts a shock absorber 72 between the connector assembly 26 and the suspension assembly 18 as known.

Figure 4:
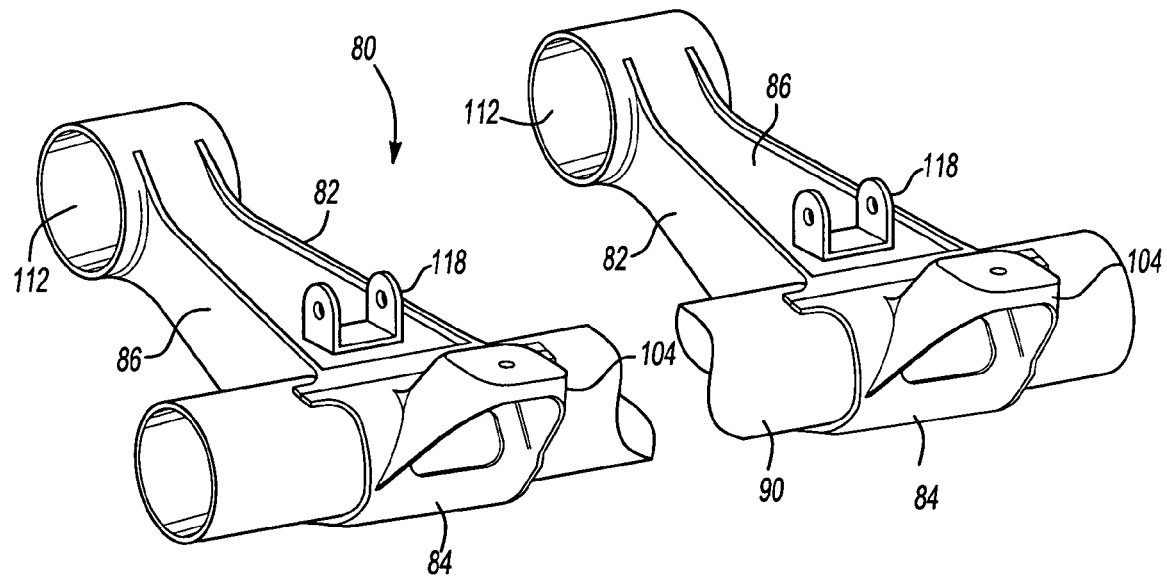
FIG. 4 is a perspective view of another example of an axle and pair of trailing arm assemblies incorporating the subject invention.
Figure 5:
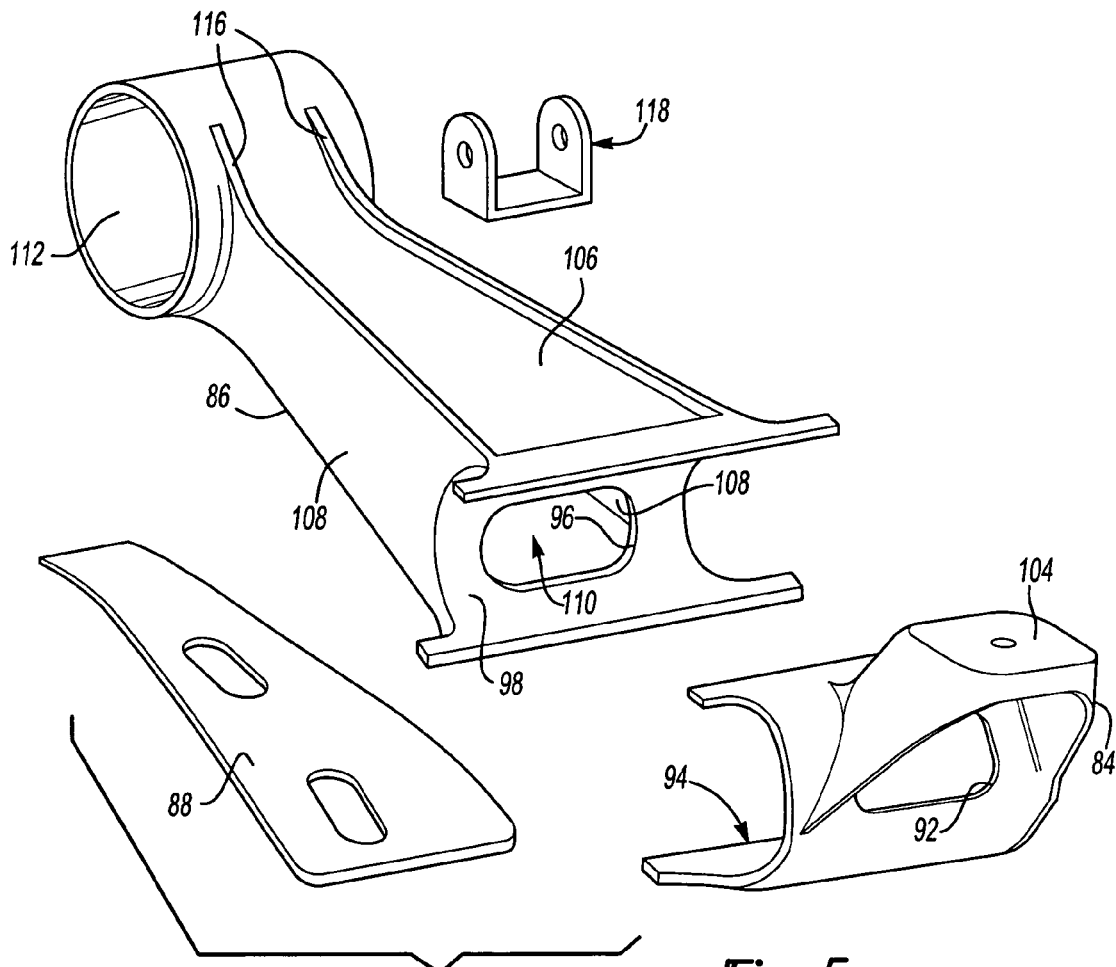
FIG. 5 is an exploded view of one trailing arm assembly from FIG. 4.
Figure 6:
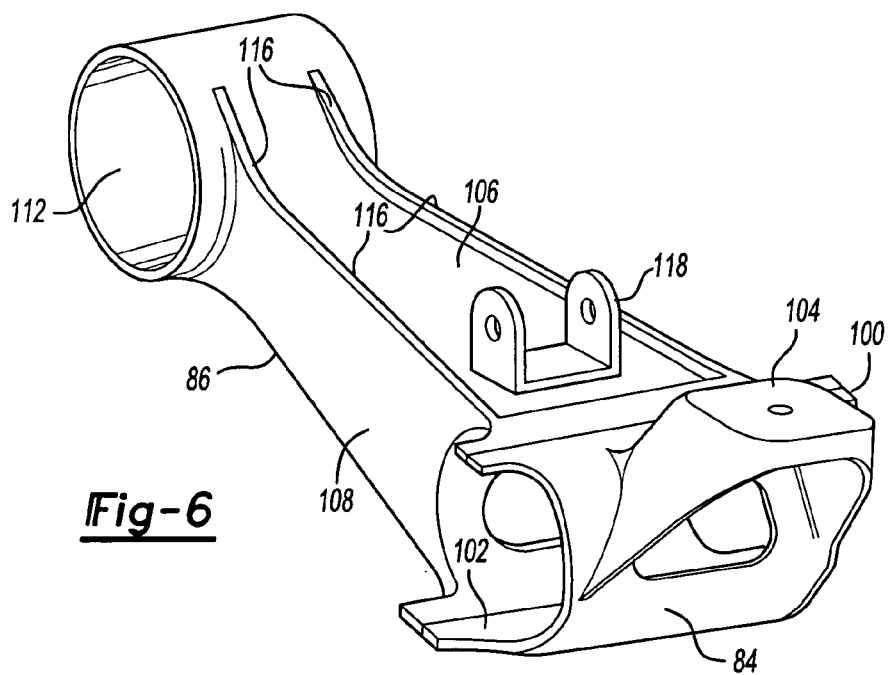
FIG. 6 is a perspective view of the trailing arm assembly of FIG. 5.

FIGS. 4, 5, and 6 show another example of a suspension assembly 80 with a unique pair of trailing arms 82. The suspension assembly 80 is similar to the suspension assembly 18 shown in FIG. 1; except the trailing arms 82 are different than the trailing arms 20.

Each trailing arm 82 includes a first cast component 84, a second cast component 86, and a bottom plate 88. The first 84 and second 86 cast components are first welded to each other. The first 84 and second 86 cast components are then welded to an axle beam 90. The first 84 and second 86 cast components substantially surround the axle beam 90 after welding. The bottom plate 88 is then welded to the second cast component 86.

The first 84 and second 86 cast components and the bottom plate 88 are shown in greater detail in FIGS. 5 and 6. The first 84 and second 86 cast components include weld areas for attachment to the axle beam 90. Again, any known type of welded joint or welding process can be used to join the weld areas to the axle beam 90. In one example, the first cast component 84 includes a first window weld area 92 and defines an inner surface 94 that substantially surrounds one side of the axle beam 90. The second cast component 86 includes a second window weld area 96 and defines an inner surface 98 that substantially surrounds an opposite side of the axle beam 90. The first 84 and second 86 cast components are first welded to each other at 100, 102. The first cast component 84 is then welded to the axle beam 90 via the first window weld area 92 and the second cast component 86 is welded to the axle beam 90 via the second window weld area 96.

The first cast component 84 includes an integrally formed air spring seat 104 that supports a suspension component, such as an air spring. The second cast component 86 includes an upper surface 106 that faces a vehicle frame member, a pair of vertical side walls 108 extending downwardly from opposing edges of the upper surface 106, and an open bottom that defines an internal cavity 110. The second cast component 86 also includes a bushing housing 112 that is integrally formed at one end. The bushing housing 112 is pivotally connected to the vehicle frame member 24, as shown in FIG. 1.

The second window weld area 96 is accessible through the internal cavity 110. Once the second cast component 86 is welded to the axle beam 90, the bottom plate 88 is welded to the second cast component 86. The bottom plate 88 is preferably a stamped piece of sheet metal. The cast components in each of the configurations shown in FIGS. 1-6 are preferably cast steel. Any type of steel can be used, with the grade of steel being determined by vehicle application, suspension type, strength and structural requirements, and/or other factors known in the art.

In the configuration shown in FIGS. 4-6, the second cast component 86 includes flanges 116 that extend upwardly from the opposing edges of the upper surface 106. A generally flat surface is formed between the flanges 116. A shock absorber bracket 118 is then welded to the second cast component 86 at the generally flat surface. The flanges 116 help reduce stress and provide clearance for a shock absorber.

Another example configuration is shown in FIGS. 7-12. A trailing arm and axle assembly is shown generally at 200 in FIG. 7. The trailing arm and axle assembly 200 includes an axle beam 202 that defines a lateral axis 204 extending between a pair of vehicle wheels (not shown). First 206 and second 208 trailing arm assemblies are laterally spaced apart from each other along the lateral axis 204.

The first 206 and second 208 trailing arm assemblies each include a front suspension arm 210 and a rear suspension arm 212 that are cast components. A bushing tube 214 is mounted to each front suspension arm 210. The bushing tube 214 mounts the first 206 and second 208 trailing arm assemblies to a suspension frame bracket assembly or vehicle mount, which is connected to a vehicle or trailer frame member as described above. The bushing tube 214 defines a central bushing axis 216 that is generally parallel to the lateral axis 204.

Figure 8:
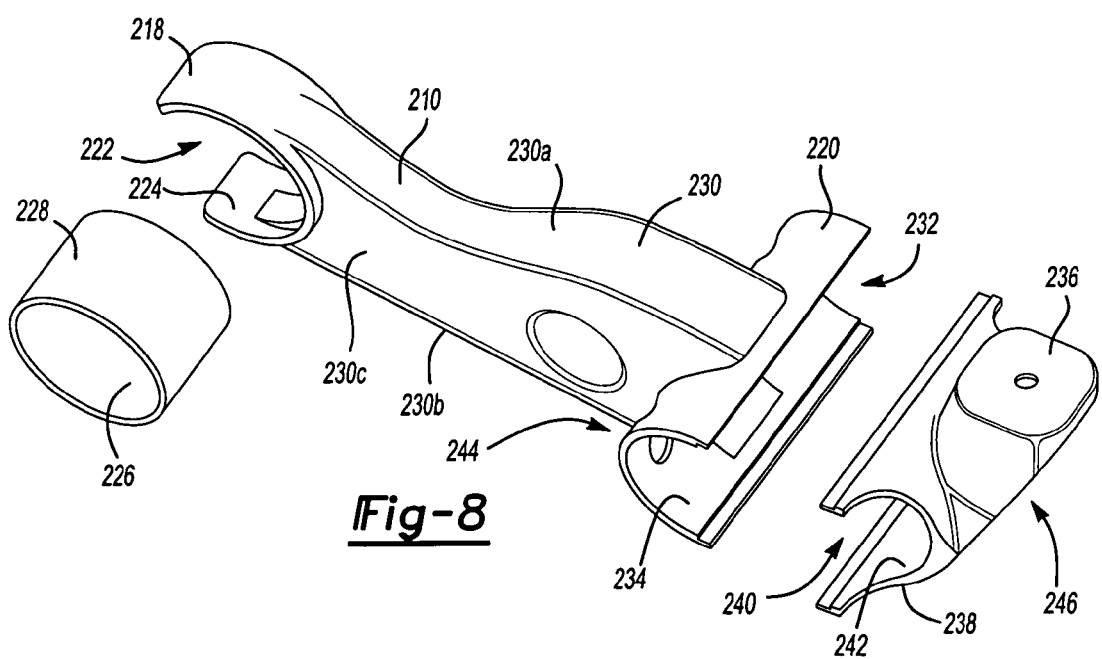
FIG. 8 is an exploded view of one trailing arm assembly from FIG. 7

As shown in FIG. 8, the front suspension arm 210 includes a bushing receiver portion 218 and an axle receiver portion 220. The bushing receiver portion 218 is connected to the bushing tube 214 and the axle receiver portion 220 is connected to the axle beam 202. The bushing receiver portion 218 includes a recess 222 defined by an arcuate surface 224 that extends less than 360° about the central bushing axis 216. The bushing tube 214 includes an inner peripheral surface 226 and an outer peripheral surface 228 that each extend 360° about the central bushing axis 216. The arcuate surface 224 and the outer peripheral surface 228 are positioned in abutting engagement, and the front suspension arm 210 and the bushing tube 214 are then attached to each other. Preferably, the front suspension arm 210 and bushing tube 214 are welded together, however, other known attachment methods could also be used.

The front suspension arm 210 includes an arm body 230 that extends from the axle receiver portion 220 to the bushing receiver portion 218. The arm body 230 is transverse to the lateral axis 204 and the central bushing axis 216. The axle receiver portion 220 includes a recess 232 with an inner peripheral surface 234 that extends less than 360° about the lateral axis 204. The inner peripheral surface 234 is abutted against the axle beam 202.

Figure 9:
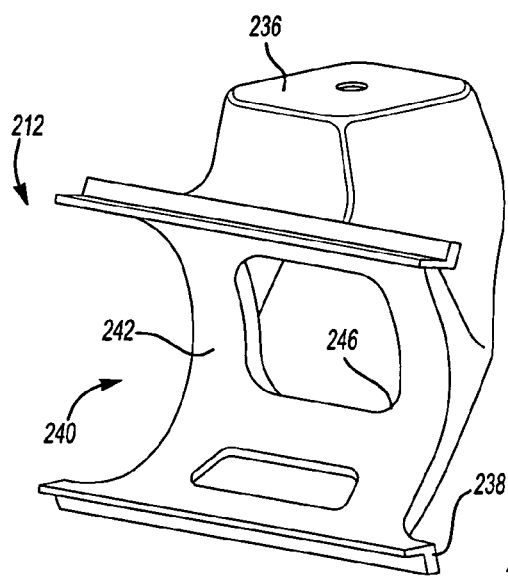
FIG. 9 is a perspective front view of a rear arm of the trailing arm assembly from FIG. 8.
Figure 10:
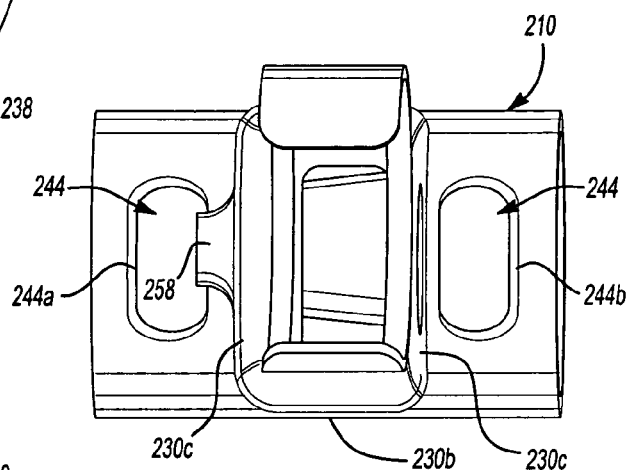
FIG. 10 is a front end view of a front arm of the trailing arm assembly from FIG. 8.

As shown in FIGS. 8 and 9, the rear suspension arm 212 includes an integrally formed spring seat portion 236 for supporting a suspension air spring and an axle receiver portion 238. The axle receiver portion 238 includes a recess 240 with an inner peripheral surface 242 that extends less than 360° about the lateral axis 204. The inner peripheral surface 242 is abutted against the axle beam 202.

The front suspension arm 210 includes a front window weld area 244 formed within the axle receiver portion 220. The rear suspension arm 212 includes a rear window weld area 246 formed within the axle receiver portion 238. The front 210 and rear 212 suspension arms are first welded to each other, and then are subsequently welded to the axle beam 202 via the front 244 and rear 246 window weld areas. The bushing tube 214 is then welded to the front suspension arm 210.

The position of the bushing tubes 214 should be tightly controlled, thus the bushing tubes 214 are welded on last to compensate for any misalignment in the suspension. This eliminates the need for machining the axle beam 202, which allows the use of a thinner wall axle tube.

In the example shown in FIG. 9, the rear window weld area 246 is a single window weld area. In the example shown in FIG. 10, the front window weld area 244 includes a first window weld area 244*a* and a second window weld area 244*b*. The first 244*a* and second 244*b* window weld areas are laterally spaced apart from each other along the lateral axis 204 and are positioned on laterally opposite sides of the arm body 230. When attached to the axle beam 202, the rear window weld area 246 is positioned generally between the first 244*a* and second 244*b* window weld areas.

The use of two (2) window welds on opposite sides of the arm body 230 reduces twisting moment that would be generated by having one offset window weld area on the front suspension arm 210. The rear suspension arm 212, with the spring seat portion 236, has a centrally positioned window weld area. This unique configuration provides flexibility of changing from a top mount suspension to a low mount suspension by simply using a different rear casting for the rear suspension arm 212. The front casting for the front suspension arm 210 and the bushing tube 214 can be used for either configuration.

Figure 7:
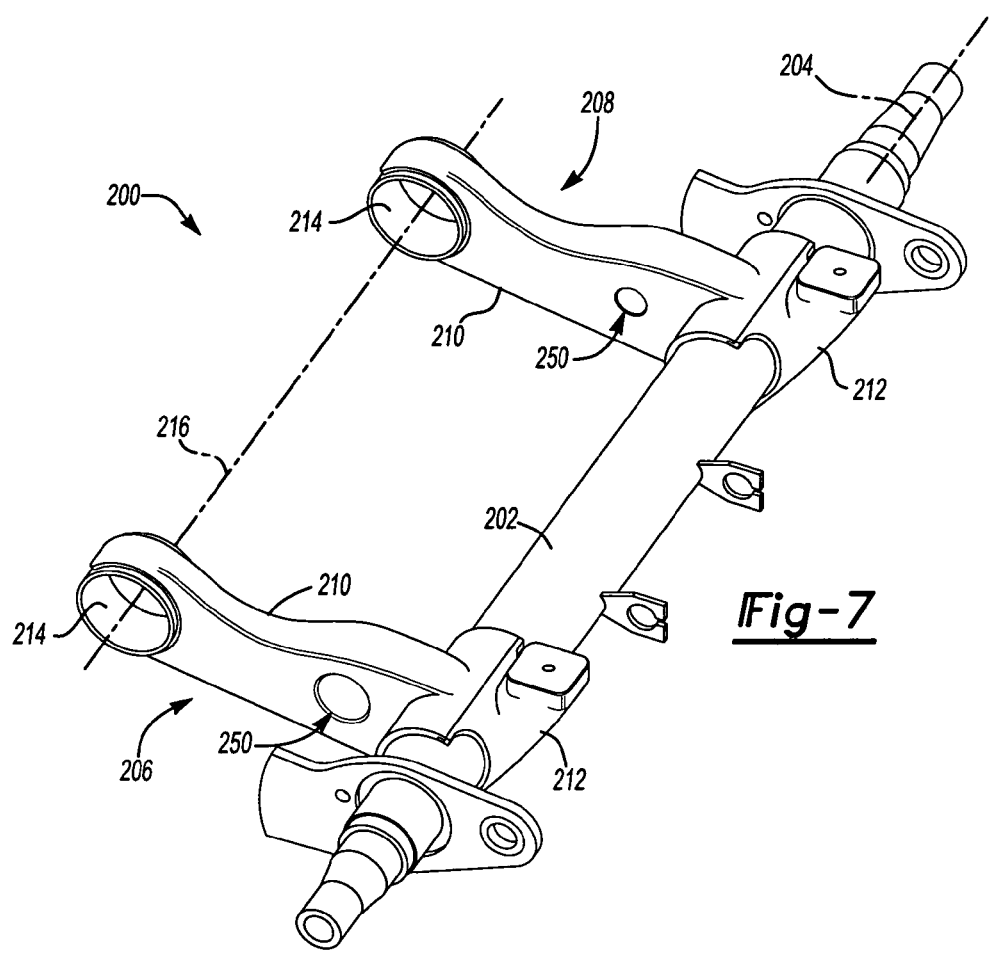
FIG. 7 is a perspective view of another example of an axle and pair of trailing arm assemblies incorporating the subject invention.

The trailing arm and axle assembly 200 includes an optional side shock absorber mount, shown generally at 250 in FIG. 7. The side shock absorber mount 250 is formed within the front suspension arm 210. The arm body 230 of the front suspension arm 210 is defined by an upper wall 230*a*, a lower wall 230*b*, and side walls 230*c* (FIG. 8). The arm body 230 is generally hollow and includes openings to the bushing receiver portion 218 and the axle receiver portion 220.

Figure 11:
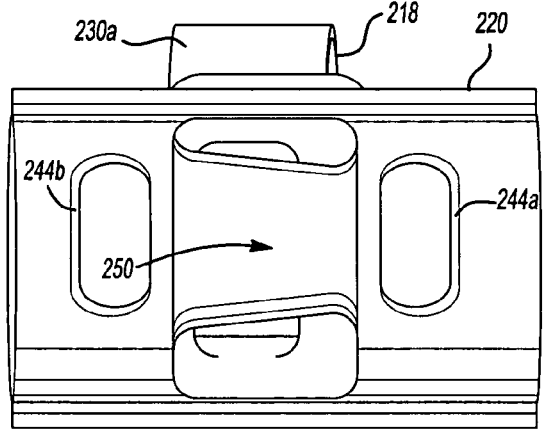
FIG. 11 is a rear end view of the front arm of FIG. 10.
Figure 12:
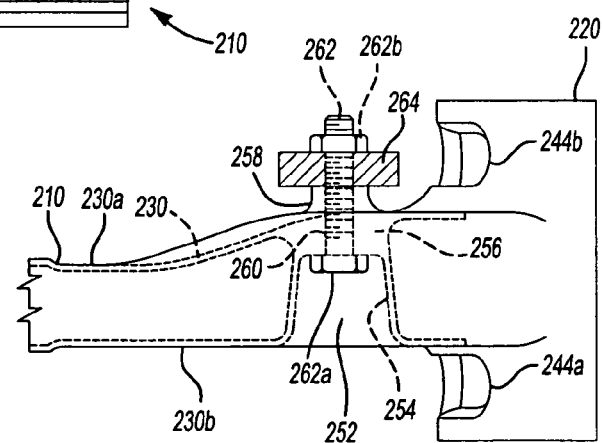
FIG. 12 is a top view of the trailing arm assembly from FIG. 8 shown in partial cross-section.

The side shock absorber mount 250 is shown in greater detail in FIGS. 11 and 12. The side shock absorber mount 250 includes a recess 252 that extends into one of the side walls 230*c*. The recess 252 is defined by a frustro-conical surface 254 that extends from an opening in one side wall 230*c* to a base mount 256 located within the arm body 230. A lip or mounting surface 258 extends outwardly from the other side wall 230*c*, as shown in FIG. 12. An opening 260 extends from the base mount 256 through the mounting surface 258. A fastener 262 is received within the recess 252 and extends through the opening 260. In the example shown, the fastener 262 is a threaded bolt 262*a* and nut 262*b*. A shock absorber mount portion 264 is secured to the front suspension arm 210 at the mounting surface 258 with the fastener 262 as shown.

Thus, the side shock absorber mount 250 is incorporated into a casting for the front suspension arm 210 and does not require any additional pieces to be welded to the front suspension arm 210. The frustro-conical cross-section increases section strength and allows for a shorter fastener. By extending the recess 252 into the side wall 230*c*, a closed section is formed for that provides a closed section for attaching the nut 262*b* to the threaded bolt 262*a*. The closed section helps prevent contamination, which can lead to corrosion and pre-mature wear or failure.

The subject invention provides lightweight and high strength trailing arms 20, 82, 206, 208 that have fewer components, and which are less expensive and less time consuming to assemble compared to prior designs.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A trailing arm assembly for a suspension comprising:
   a bushing tube;
   a plurality of cast components including at least a first cast component and a second cast component with said bushing tube being attached to one of said first and said second cast components, said first cast component defining a first weld area and said second cast component defining a second weld area, wherein said first weld area comprises first and second window weld areas and said second weld area comprises a third window weld area, and wherein said first and second cast components are separately weldable to an axle component at said first and second weld areas; and wherein said one of said first and said second cast components includes an arm end for supporting said bushing tube, said arm end having a recess defined by an arcuate surface that extends less than 360° about a center of said recess, and wherein said first cast component comprises a front suspension arm including said arm end for supporting said bushing tube and another end including said first weld area.

2. The trailing arm assembly according to claim 1 wherein said first cast component defines a first inner surface formed to generally surround a portion of the axle component and said second cast component defines a second inner surface formed to generally surround a remaining portion of the axle component.

3. The trailing arm assembly according to claim 2 wherein said first and second cast components are welded to each other to substantially surround an outer perimeter of the axle component prior to being welded to the axle component at said first and second weld areas.

4. The trailing arm assembly according to claim 3 wherein said bushing tube is welded to said one of said first and said second cast components subsequent to said first and said second cast components being welded to the axle component.

5. The trailing arm assembly according to claim 1 wherein said second cast component comprises a rear suspension arm having a spring seat portion adapted to support a suspension air spring.

6. The trailing arm assembly according to claim 5 wherein said spring seat portion is integrally formed with said second cast component as a single piece.

7. The trailing arm assembly according to claim 1 wherein said bushing tube includes a center opening with an inner circumferential surface and an outer circumferential surface extending 360° about a center defined by said center opening and wherein said arcuate surface of said front suspension arm surrounds a portion of said outer circumferential surface of said bushing tube.

8. The trailing arm assembly according to claim 1 wherein said front suspension arm includes a shock absorber side mount portion.

9. The trailing arm assembly according to claim 1 wherein the axle component comprises a tubular trailer axle that is extendable between a pair of wheel ends.

10. The trailing arm assembly according to claim 9 wherein said bushing tube is adapted to be connected to a vehicle frame member and one of said first and said second cast components is adapted to support a suspension air spring.

11. The trailing and assembly according to claim 9 wherein said first and said second cast components are directly welded to said tubular trailer axle.

12. A trailing arm assembly for a suspension comprising:
a bushing tube;
a plurality of cast components including at least a first cast component and a second cast component with said bushing tube being attached to one of said first and said second cast components, said first cast component defining a first weld area and said second cast component defining a second weld area wherein said first and second cast components are separately weldable to an axle component at said first and second weld areas; and
wherein said first cast component comprises a front suspension arm having a first end for supporting said bushing tube and a second end including said first weld area, and said front suspension aim including a shock absorber side mount portion wherein said shock absorber side mount portion includes a frustro-conical recess extending into a side wall of said front suspension arm.

13. A trailing arm assembly for a suspension comprising:
a bushing tube;
a plurality of cast components including at least a first cast component and a second cast component with said bushing tube being attached to one of said first and said second cast components, said first cast component defining a first weld area and said second cast component defining a second weld area wherein said first and second cast components are separately weldable to an axle component at said first and second weld areas;
wherein said first cast component comprises a front suspension arm having a first end for supporting said bushing tube and a second end including said first weld area wherein said first weld area comprises first and second window weld areas and said second weld area comprises a third window weld area; and
wherein said front suspension arm includes an arm body extending between said first and said second ends and wherein said first window weld area is formed within said second end and is positioned on one lateral side of said and body and the second window weld area is fanned within said second end and is positioned on an opposite lateral side of said arm body from said first window weld area.

14. An axle and suspension assembly comprising:
a tubular axle member defining a lateral axis;
a first trailing arm assembly supported on said tubular axle member;
a second trailing arm assembly supported on said tubular axle member, said second trailing arm assembly being laterally spaced from said first trailing arm assembly along said lateral axis;
wherein said first and said second trailing arm assemblies each include a front suspension arm having a bushing receiver portion and an axle receiver portion, a bushing tube supported on said bushing receiver portion, and a rear suspension arm attached to said axle receiver portion, said front suspension arm defining a first weld area and said rear suspension arm defining a second weld area wherein said front and said rear suspension arms are separately weldable to said tubular axle member at said first and second weld areas; and
wherein said front suspension arm extends transverse relative to said lateral axis and wherein said first weld area comprises a first window weld area positioned on one lateral side of said front suspension arm and a second window weld positioned on an opposite lateral side of said front suspension arm and wherein said second weld area comprises a third window weld area positioned laterally between said first and said second window weld areas.

15. The axle and suspension assembly according to claim 14 wherein said bushing tube defines a bushing axis of rotation parallel to said lateral axis and wherein said bushing receiver portion of said front suspension arm includes a recess defined by an arcuate surface that extends less than 360° about said bushing axis of rotation.

16. The axle and suspension assembly according to claim 15 wherein said bushing tube includes an outer peripheral surface that extends 360° about said bushing axis of rotation and wherein said outer peripheral surface is in abutting engagement with said arcuate surface of said bushing receiver portion.

* * * * *

UNITED STATES PATENT AND TRADEMARK OFFICE
CERTIFICATE OF CORRECTION

PATENT NO.        : 7,360,774 B2                                          Page 1 of 1
APPLICATION NO.   : 11/016297
DATED             : April 22, 2008
INVENTOR(S)       : Saieg et al.

It is certified that error appears in the above-identified patent and that said Letters Patent is hereby corrected as shown below:

Claim 11, Column 7, line 50: "and" should read as --arm--

Claim 12, Column 7, line 66: "aim" should read as --arm--

Claim 13, Column 8, line 24: "and" should read as --arm--

Claim 13, Column 8, line 25: "fanned" should read as --formed--

Signed and Sealed this

Fifth Day of August, 2008

JON W. DUDAS
*Director of the United States Patent and Trademark Office*